(12) United States Patent
Kovalsky et al.

(10) Patent No.: US 7,246,998 B2
(45) Date of Patent: Jul. 24, 2007

(54) MISSION REPLACEABLE ROTOR BLADE TIP SECTION

(75) Inventors: David A. Kovalsky, Shelton, CT (US); Kevin P. Viola, Wallingford, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 66 days.

(21) Appl. No.: 10/991,745

(22) Filed: Nov. 18, 2004

(65) Prior Publication Data

US 2006/0104812 A1 May 18, 2006

(51) Int. Cl.
B64C 27/473 (2006.01)

(52) U.S. Cl. .................. 416/87; 416/88; 416/210 R

(58) Field of Classification Search ............. 416/87, 416/88, 210 R, 228
See application file for complete search history.

(56) References Cited

U.S. PATENT DOCUMENTS

| | | | |
|---|---|---|---|
| 2,606,728 A * | 8/1952 | Sikorsky | 244/134 B |
| 5,246,344 A | 9/1993 | Perry | |
| 5,320,494 A | 6/1994 | Reinfelder et al. | |
| 5,542,820 A * | 8/1996 | Eaton et al. | 416/224 |
| 5,588,800 A | 12/1996 | Charles et al. | |
| 5,595,475 A | 1/1997 | Weiss et al. | |
| 5,785,282 A | 7/1998 | Wake et al. | |
| 5,788,191 A | 8/1998 | Wake et al. | |
| 5,885,059 A | 3/1999 | Kovalsky et al. | |
| 5,927,948 A | 7/1999 | Perry et al. | |
| 5,954,898 A | 9/1999 | McKague et al. | |
| 5,992,793 A | 11/1999 | Perry et al. | |
| 6,168,383 B1 | 1/2001 | Shimizu | |
| 6,190,132 B1 | 2/2001 | Yamakawa et al. | |
| 6,231,308 B1 | 5/2001 | Kondo | |
| 6,260,809 B1 | 7/2001 | Egolf et al. | |
| 6,976,829 B2 * | 12/2005 | Kovalsky et al. | 416/226 |
| 2005/0281676 A1 * | 12/2005 | Egolf et al. | 416/228 |

* cited by examiner

Primary Examiner—Edward K. Look
Assistant Examiner—Nathan Wiehe
(74) Attorney, Agent, or Firm—Carlson, Gaskey & Olds

(57) ABSTRACT

A rotor blade includes a removable blade tip section which is mounted to an outboard rotor blade section by mechanically mounting a tip spar to a main blade spar with a spar interface section which bridges a butt joint between the blade spar and the tip spar. The spar interface section is mounted within the blade spar and the tip spar with a multiple of threaded fasteners which are under shear load during rotor blade rotation.

29 Claims, 7 Drawing Sheets

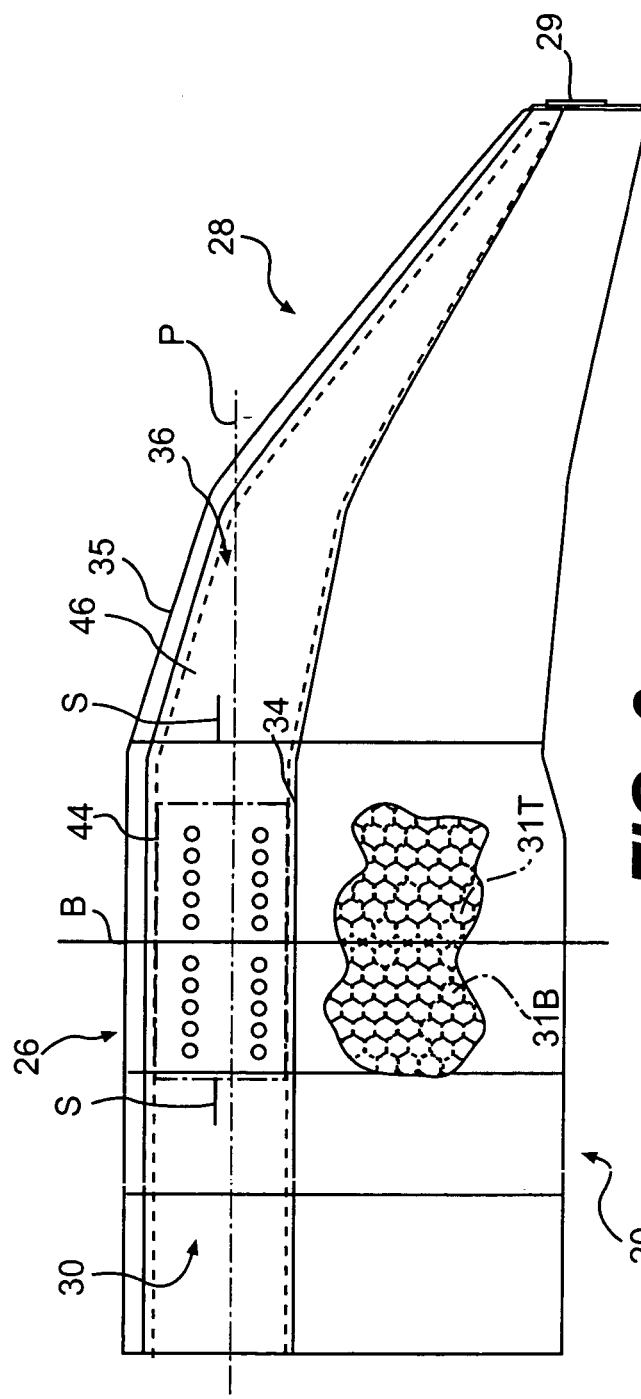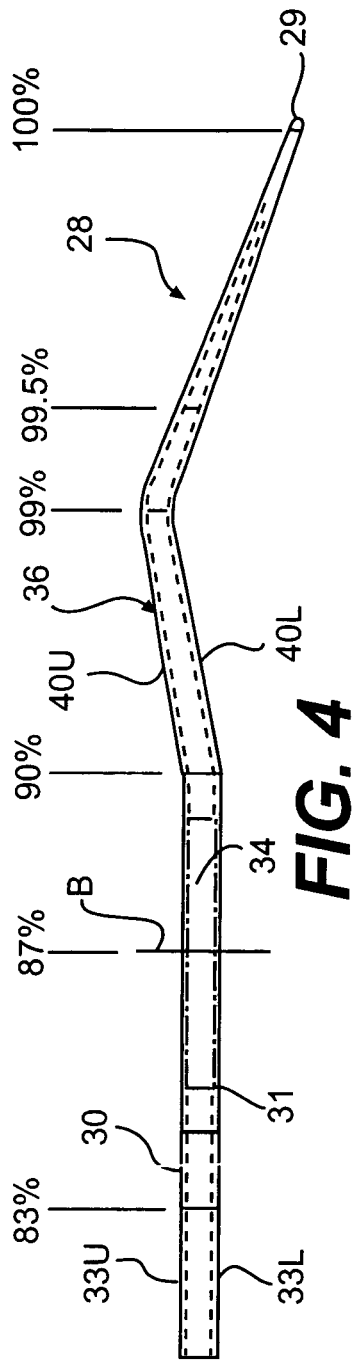
FIG. 3
FIG. 4

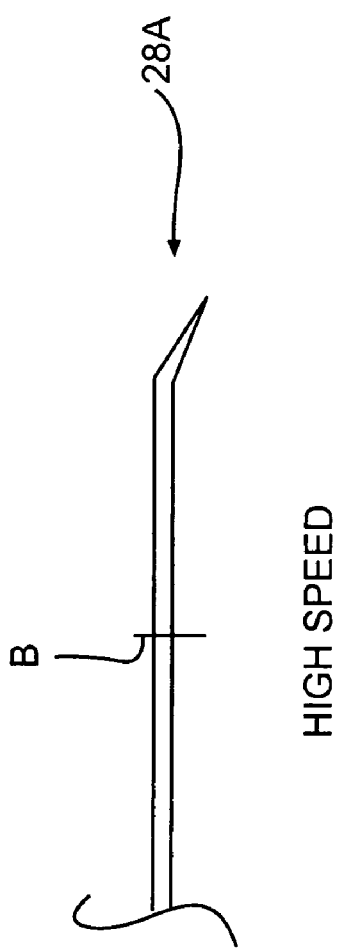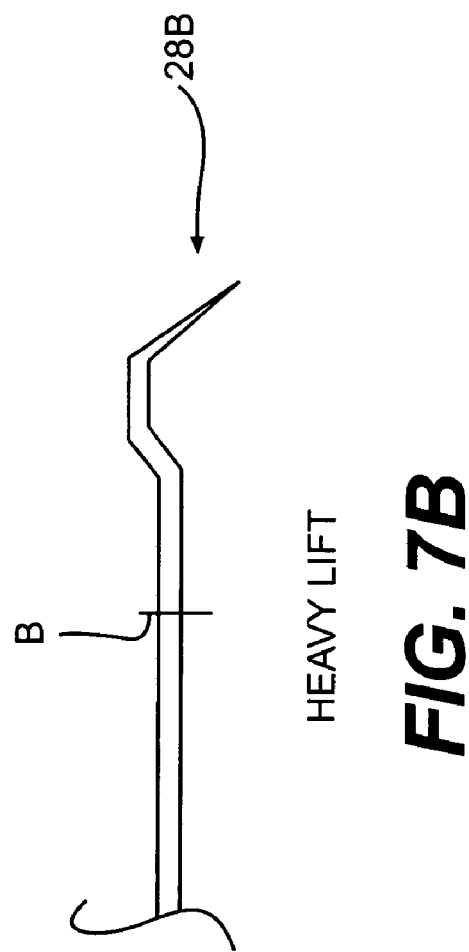

MISSION REPLACEABLE ROTOR BLADE TIP SECTION

BACKGROUND OF THE INVENTION

The present invention relates to a rotary wing aircraft rotor blade, and more particularly to a replaceable tip section therefor.

Conventional rotary wing aircraft rotor blades often include an anhedral tip section of a selected sweep, taper, and form to improve the blade performance. Anhedral tip sections increase hover performance and lift capabilities of a rotary wing aircraft on which the blades are fitted without increasing the structural features of the main rotor hub and spindle.

Rotor blade tip sections are subjected to the greatest stresses/strains due to aerodynamic forces, and concomitantly experiences the greatest structural degradation due to wear and abrasion (due to the high rotational velocity of the main rotor blade tip), during operation of the helicopter main rotor assembly. These forces are only increased upon a tip section which utilizes an anhedral or other non-straight form.

Typically, only a very end portion of a main rotor blade tip is designed to be replaceable since the tip portion is most susceptible to damage caused by erosion and solid object strikes. The replaceable portion is typically the outermost straight section comprising a blade station length of approximately eight inches. The length of the replaceable portion of conventional rotor blade tip sections is generally limited by the strength of the attachment joint. The aforementioned anhedral tip end geometry will typically contain a dihedral bend, anhedral bend or some combination of both along with a rearward sweep. Conventional construction arrangements for such tip geometry has been to have the airfoil transition and bend be integral to the primary blade structure. The replaceable blade portion has been limited to the outermost portion of the rotor blade outboard of the complex anhedral tip geometry. The structure for an anhedral bend rotor tip section includes the structural upper and lower airfoil blade skins and shaped honeycomb core that is integrally bonded to the inboard section of the blade during the primary blade assembly. The bonded joint between the primary blade structure or spar and the structural tip end skins may be later augmented with mechanical fasteners to produce a redundant joint. This approach makes replacement of the complex geometry portion of the blade tip relatively difficult while requiring extensive labor in a significant manufacturing facility type to accomplish replacement.

Recent main rotor blade development work to improve performance has determined that geometry shapes and airfoil cross-section of the blade tip end does offer significant benefit to helicopter mission requirements. One dilemma is that a single tip end geometry will not satisfy all mission profiles. An aircraft with a heavy lift mission profile may be best suited with a different tip end geometry than a helicopter that with a mission profile for high speed forward flight and so on and so forth.

Accordingly, it is desirable to provide a replaceable rotor blade tip section that is applicable to anhedral form, minimizes the number of structural components, yet may be readily replaced to tailor the main rotor blade tip end geometry to accommodate mission requirements.

SUMMARY OF THE INVENTION

The main rotor blade according to the present invention includes a removable blade tip section which is mounted to an outboard blade section by mechanically mounting a tip spar to a main blade spar with a spar interface section which bridges the blade spar and the tip spar. Close tolerances between a hollow inboard tip spar section, a hollow outboard blade spar section and the spar interface section provide alignment of the replaceable blade tip section to the outboard blade section without a special tooling fixture. Various tip sections may be attached mechanically in a field environment prior to a specific mission such as heavy lift, high speed transit, loiter or others.

The spar interface section is mounted within the hollow outboard section of the blade spar with a multiple of threaded fasteners and within the hollow inboard section of an inboard tip spar section with a multiple of threaded fasteners. The fasteners are preferably bolts that are located through the upper skin and lower skin of the outboard blade section and sit flush therewith when installed.

Another main rotor blade includes a spar interface section that slides through openings in the blade spar and tip spar leading edges. Ramped spar interface sections engage respective ramped blade spar transition surfaces and ramped tip spar transition surfaces to provide a mechanical interlock in addition to a multiple of fasteners which are recessed below a respective upper blade spar surface a lower blade spar surface, a tip spar section upper surface and a tip spar section lower surface. A fairing which corresponds to the rotor blade shape covers a butt joint between the blade spar, tip spar, and the fasteners to provide a smooth aerodynamic blade surface.

The present invention therefore provides a replaceable rotor blade tip section that is applicable to anhedral form, minimizes the number of structural components, yet may be readily replaced to tailor the main rotor blade tip end geometry to accommodate specific mission requirements.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 3 is an expanded top plan view of a removable rotor blade tip section of a rotor blade;

FIG. 4 is an expanded rear view of a removable rotor blade tip section of a rotor blade;

FIG. 7A is a schematic view of a rotor blade with a "high speed" removable rotor blade tip section of a rotor blade;

FIG. 7B is a schematic view of a rotor blade with a "heavy lift" removable rotor blade tip section of a rotor blade.

DETAILED DESCRIPTION OF THE PREFERRED EMBODIMENT

Figure 1:
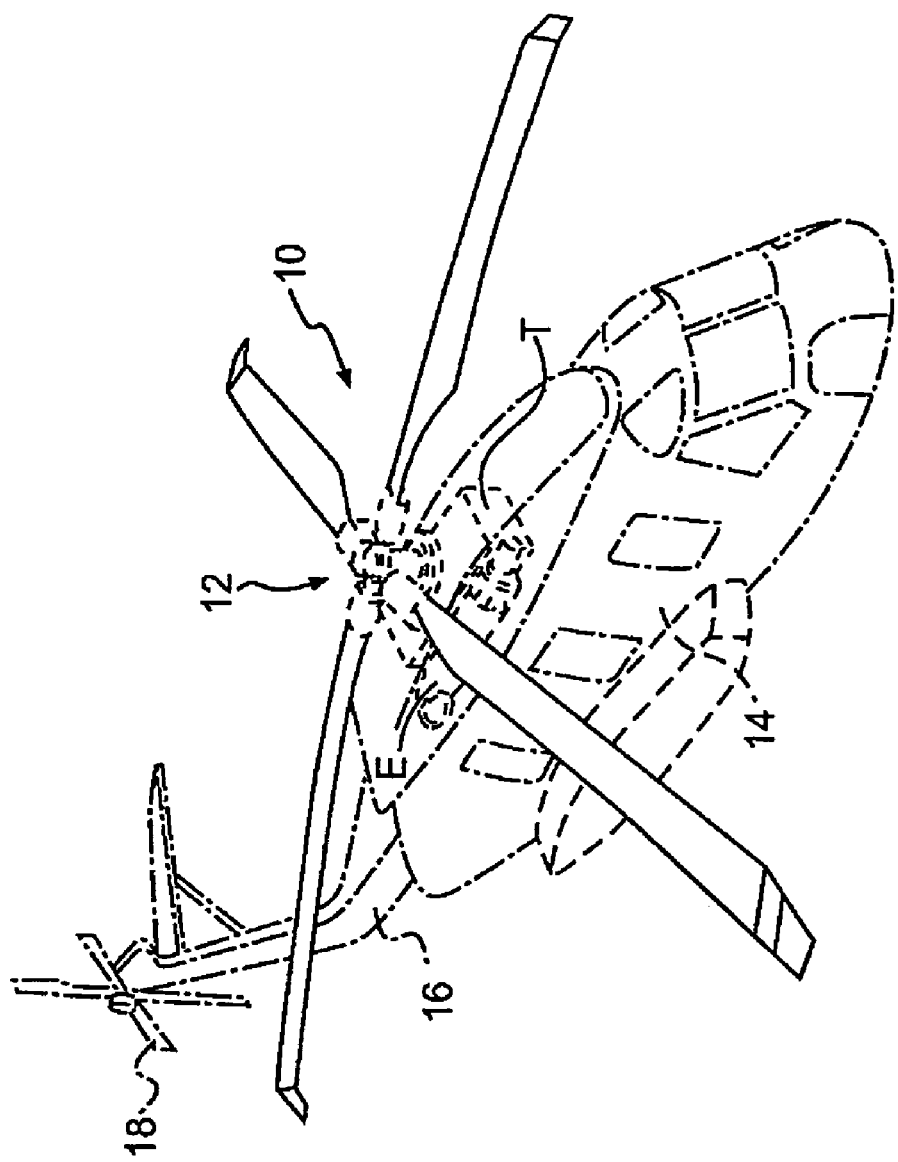
FIG. 1 is a general perspective view an exemplary rotary wing aircraft embodiment for use with the present invention.

FIG. 1 schematically illustrates a rotary-wing aircraft 10 having a main rotor assembly 12. The aircraft 10 includes an airframe 14 having an extending tail 16 which mounts an anti-torque rotor 18. The main rotor assembly 12 is driven through a transmission (illustrated schematically at T) by one or more engines E. Although a particular helicopter configuration is illustrated in the disclosed embodiment, other machines such as turbo-props, tilt-rotor and tilt-wing aircraft will also benefit from the present invention.

Figure 2:
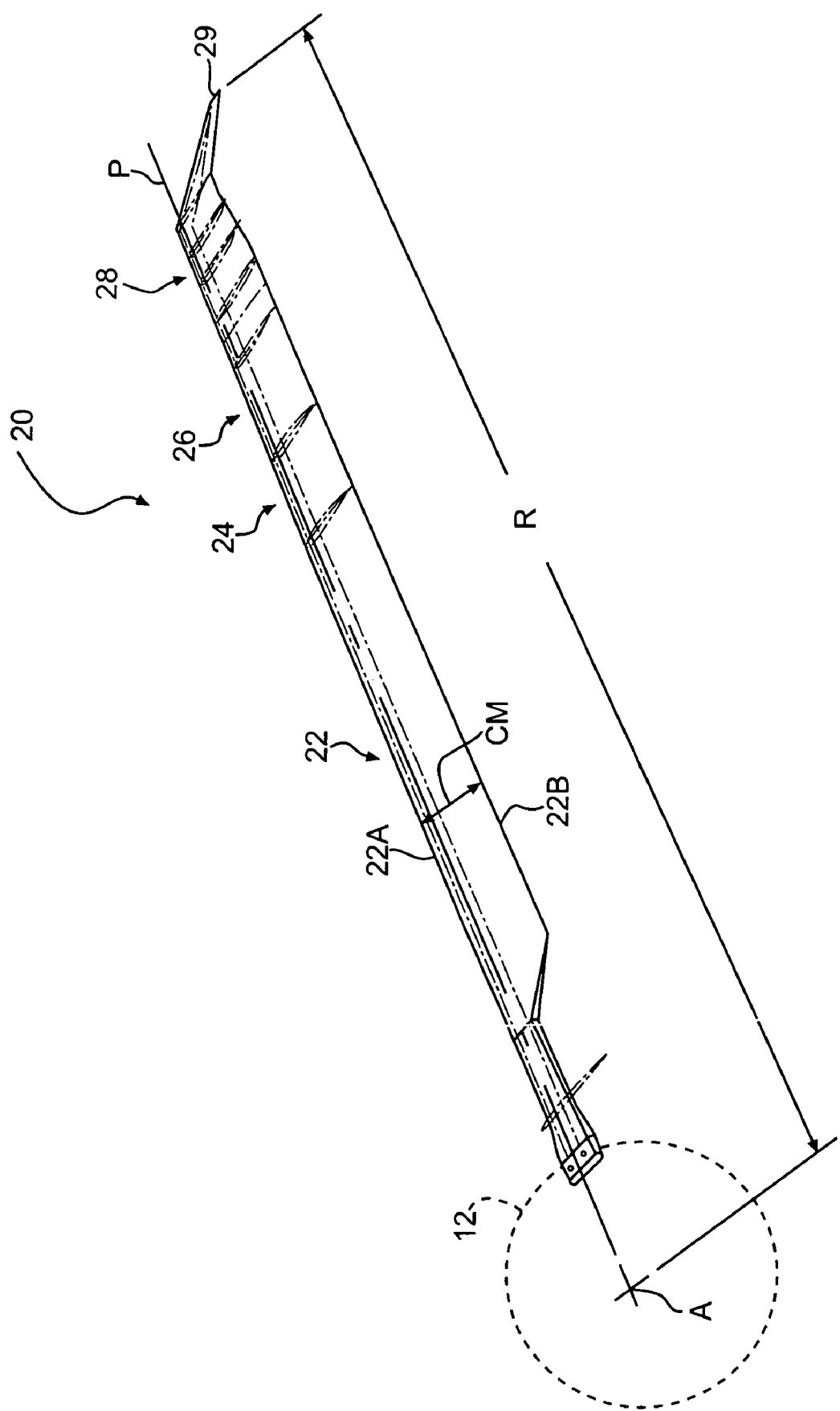
FIG. 2 is a perspective plan view of an exemplary main rotor blade assembly.

Referring to FIG. 2, a rotor blade 20 (only one illustrated) of the rotor assembly 12 includes an inboard section 22, an intermediate section 24, and an outboard section 26. The inboard, intermediate, and outboard sections 22, 24, 26 define the span of the main rotor blade 20. The rotor blade sections 22, 24, 26 define a blade radius R between the axis of rotation A and a distal end 29 of a replacement blade tip section 28. The rotor blade 20 further defines a longitudinal feathering axis P. Each rotor blade section 22, 24, 26 preferably defines particular airfoil geometries to particularly tailor the rotor blade aerodynamics to the velocity increase along the rotor blade span.

The rotor blade 20 defines a leading edge 22a and a trailing edge 22b, which are generally parallel to each other. The distance between the leading edge 22a and the trailing edge 22b defines a main element chord length Cm.

The outboard blade section 26 receives the removable blade tip section 28. The removable blade tip section 28 may include variations in chord, pitch, taper, sweep, and airfoil distributions. Although a rotor blade is disclosed in the illustrated embodiment, other aerodynamic members such as aircraft and marine propellers, fans, tilt-rotors, wind turbines, and other rotary-wing devices will benefit from the present invention.

Referring to FIG. 3, each blade 20 includes a main blade spar 30. The main blade spar 30 is a structural member having high torsional and axial stiffness and strength, and in the preferred embodiment is made of a high strength composite material. However, the blade spar 30 may also be made from a high strength metal, such as titanium. The blade 20 preferably includes a blade core 31B covered by an upper and lower composite blade skin 33U, 33L (FIG. 4), which defines the airfoil cross-section of the blade as generally known. It should be understood that the airfoil cross-section of the blade may vary along the span thereof.

The replaceable blade tip section 28 includes a splice cap 35, a tip spar 36, a tip core 31T, 39, and an upper and lower tip skin 40U, 40L (FIG. 4). The tip spar 36 is preferably the main structural component within the replaceable blade tip section 28. It should be understood that "structural" herein defines a flight load carrying structure.

The rotor blade 20 is fabricated to receive the replaceable blade tip section 28 in a field environment. The replaceable blade tip section 28 provides a selected configuration of rearward sweep, taper, dihedral, width, and anhedral to accommodate particular mission requirements. The replaceable blade tip section 28 preferably includes an anhedral form, however, other angled and non angled forms such as cathedral, gull, bent, and others will benefit from the present invention.

The main blade spar 30 extends to a butt joint B located in the outboard section 26 to receive the replaceable blade tip section 28 preferably prior to any tip configuration. It should be understood that the blade sections 22, 24, 26 are defined for descriptive purposes and may or may not define different airfoil configurations.

The replaceable blade tip section 28 is mounted to the outboard blade section 26 by a spar interface section 34 which bridges the blade spar 30 and the tip spar 36 formed within the tip section 28. Preferably, a butt joint B is located at approximately 87% R along the blade span. The butt joint B is located at or within the blade station that defines an end of a constant mid span airfoil cross section formed by the outboard section 26. That is, the replaceable blade tip section 28 preferably includes an airfoil transition from the constant mid span airfoil cross-section to a high performance tip airfoil cross-section. The dihedral/anhedral bends are all contained in the replaceable blade tip section 28. The tip section 28 also preferably includes any rearward sweep and/or taper of the tip airfoils.

The tip spar 36 preferably defines an inboard tip spar section 44 and an outboard tip spar section 44. The inboard tip spar section 46 generally extends along the feathering axis P defined by the main rotor main blade spar 30 and the outboard tip spar section 46 may be angled relative thereto to define the sweep. The outboard tip spar section 46 also preferably completely defines the tip form such as angled and non-angled tip forms such as cathedral, gull, bent, as well as others that will benefit from the present invention. It should be understood that the outboard tip spar section 46 may also include multiple sections angled out of a plane defined by the blade spar 30 to define tip forms such as a multi-angled cathedral tip section (FIG. 4). Relatively complex tip forms are readily usable with the present invention as any relatively complex anhedral tip geometry is wholly formed within the replaceable tip section 28.

Figure 5:
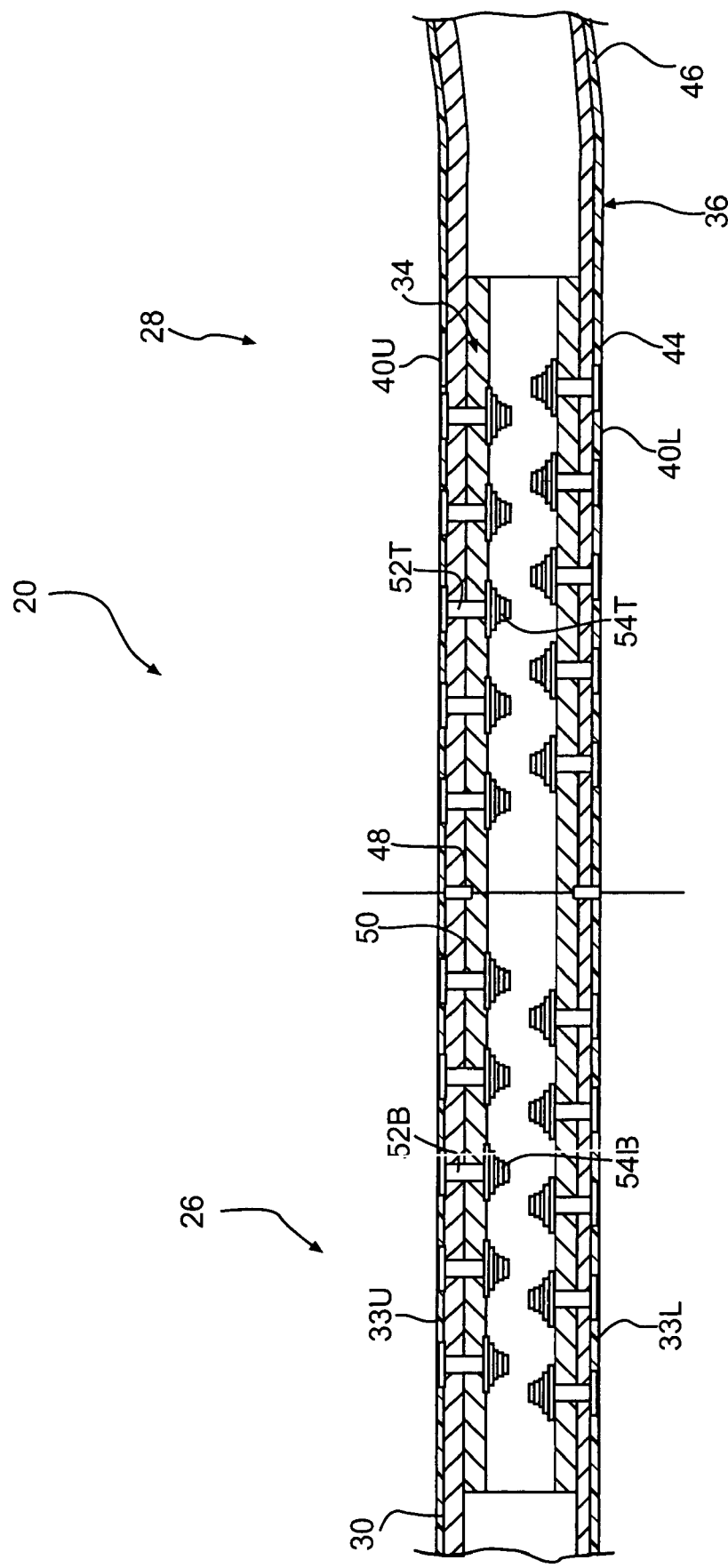
FIG. 5 is a cross-sectional view of the main rotor blade of FIG. 3 taken along line 5—5 thereof.
Figure 6:
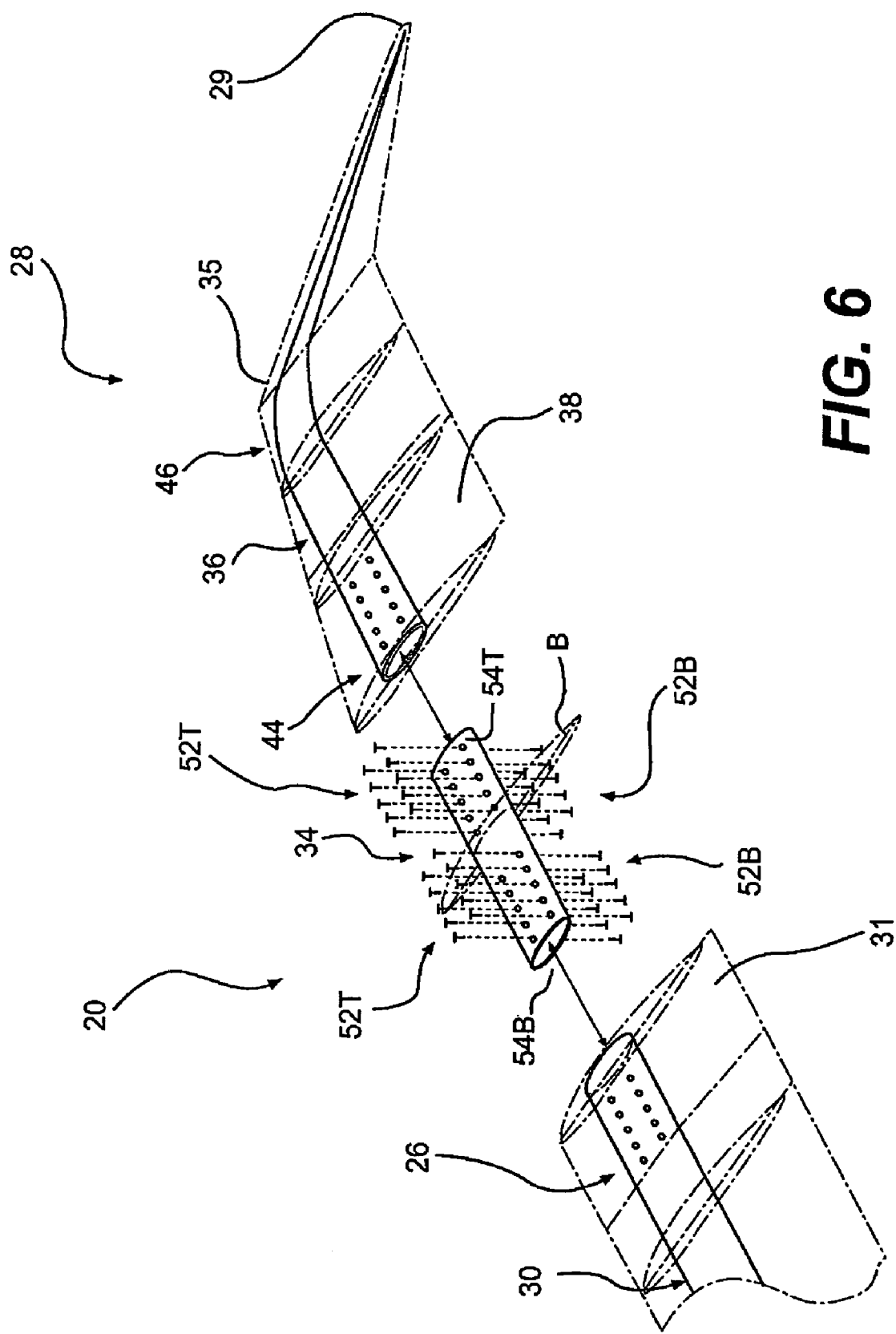
FIG. 6 is an exploded view of a removable rotor blade tip section of a rotor blade.

Referring to FIG. 5, the replaceable blade tip section 28 is attached to the blade spar 30 by sliding a hollow inboard spar section 48 of the inboard tip spar section 44 and a hollow outboard spar section 50 of the blade spar 30 over the spar interface section 34 (FIG. 6). Preferably, the butt joint B is formed between the hollow inboard section 48 of the inboard tip spar section 46 and the hollow outboard section 50 of the blade spar 30. The butt joint B defines the interface between the blade skins 33U, 33L and the tip skins 40U, 40L.

Close tolerances between the hollow inboard tip spar section 48, the hollow outboard blade spar section 50 and the spar interface section 34 provide alignment of the tip section 28 to the outboard blade section 26 permits field expedient selective installation of various removable tip sections 28a, 28b (illustrated schematically at FIGS. 7A, 7B) without a special tooling fixture. That is, the outer surface of the spar interface section 34 fits closely within the inner surface of the hollow inboard tip spar section 48, the hollow outboard blade spar section 50. The various tip sections such as, for example only, 28a, 28b may be alternatively selectively attached mechanically in a field environment prior to a specific mission such as heavy lift, high speed transit, loiter or others.

The spar interface section 34 is mounted within the hollow outboard section 50 of the blade spar 30 with a multiple of threaded fasteners 52B and within the hollow inboard section 48 of the inboard tip spar section 46 with a multiple of threaded fasteners 52T. The fasteners 52B, 52T are preferably bolts which are located through the upper skins 33U, 40U and lower skins 33L, 40L and sit flush therewith when installed.

The spar interface section 34 is preferably of a hollow construction to incorporate a multiple of threaded fastener receivers 54B. 54T therein to receive the fasteners 52B, 52T.

The threaded fastener receivers 54B, 54T are preferably permanently mounted to the spar interface section 34 such as through bonding. It should be understood that other fastener and fastener receiver arrangements may also be used with the present invention. The spar interface section 34 and threaded fastener receivers 54B, 54T are preferably controlled through a master pattern which is utilized for each replaceable blade tip section 28 to permit inter-changeability of the replaceable blade tip sections 28A, 28B (FIGS. 7A, 7B; illustrated schematically) to the same blade. Mechanical fastening is preferred to permit the relatively rapid interchange of replaceable blade tip sections 28.

After sliding the hollow inboard tip spar section 48 and the hollow outboard blade spar section 50 over the spar interface section 34, the fasteners 52B, 52T are installed into the threaded fastener receivers 54B, 54T to secure the tip section 28 to the outboard blade section 26. The spar interface section 34 spans the butt joint B. The mechanical fasteners 52B, 52T are preferably arranged in a longitudinal pattern generally parallel to the feathering axis P (FIG. 3) such that the aerodynamic loads on the replaceable blade tip section 28 place the fasteners 52B, 52T under a shear load. The spar interface section 34 and the fasteners 52B, 52T thereby transfers loads between the blade spar 30 and the tip spar 36.

Figure 8:
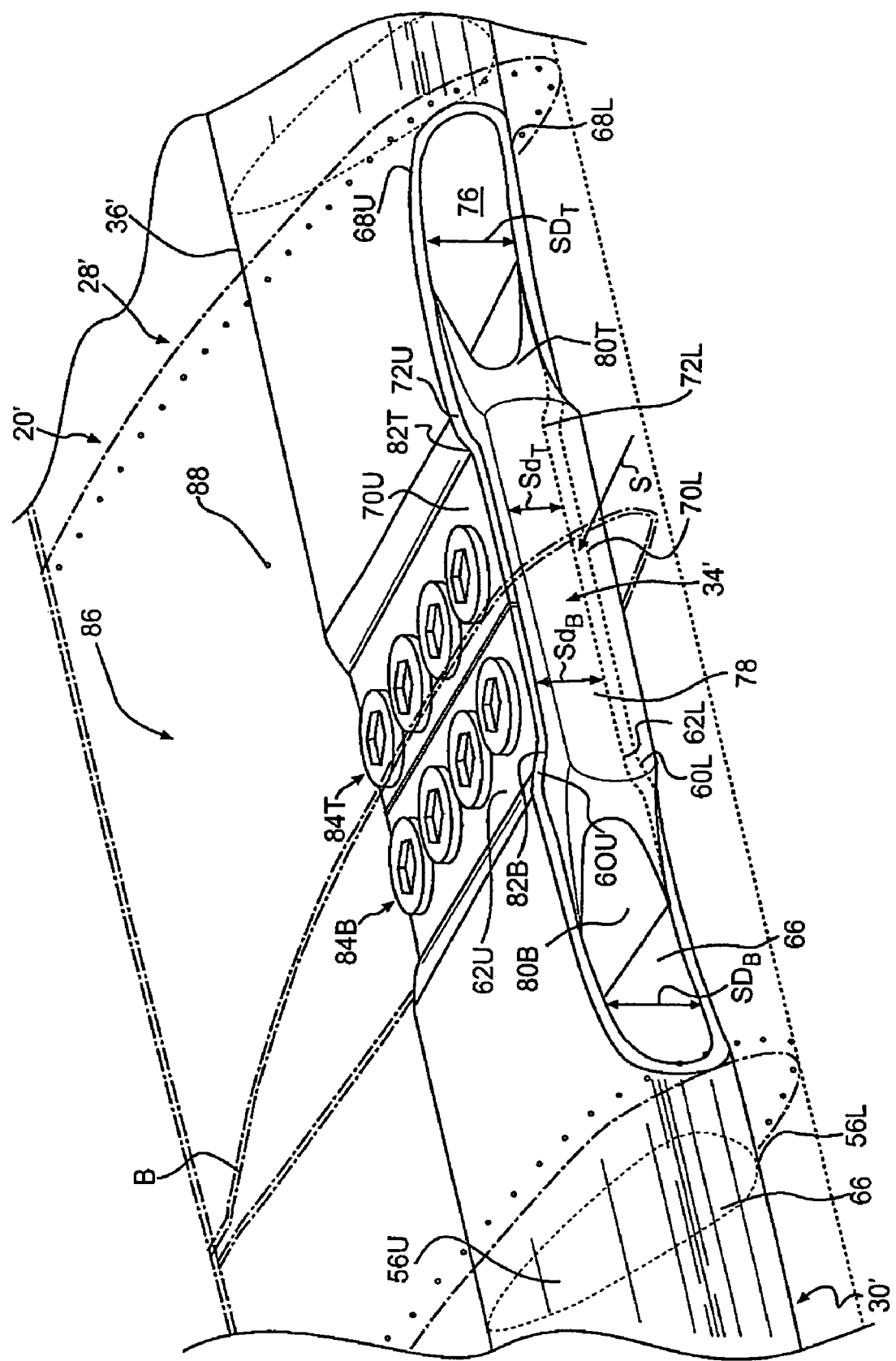
FIG. 8 is an expanded partial phantom perspective view of another removable rotor blade tip section.

Referring to FIG. 8, another removable tip section 28' is illustrated. The blade spar 30' includes an upper blade spar surface 56U and a lower blade spar surface 56L which transitions to an outboard blade spar section upper surface 62U and an outboard blade spar section lower surface 62L at respective ramped blade spar transition surfaces 60U, 60L. The outboard blade spar section upper surface 62U and the outboard blade spar section lower surface 63L defines an outboard blade spar depth $Sd_B$ which is less than a blade spar depth $SD_B$ defined between the upper blade spar surface 56U and the lower blade spar surface 56L. The ramped blade spar transition surfaces 60U, 60L connect the upper blade spar surface 56U and the lower blade spar surface 56L with the respective outboard blade spar section upper surface 62U and the outboard blade spar section lower surface 62L. The blade spar 30' is preferably manufactured as an integral member. A spar leading edge 64 includes a blade opening 66.

A tip spar 36 includes a tip spar section upper surface 68U and a tip spar section lower surface 68L that transitions to an inboard tip spar section upper surface 70U and an inboard tip spar section lower surface 70L at respective ramped tip spar transition surfaces 72U, 72L in a geometry analogous to the blade spar 30B. The tip spar section upper surface 68U and The tip spar section lower surface 68L defines a tip blade spar depth $SD_T$ and the inboard tip spar section upper surface 70U and the inboard tip spar section lower surface 70L defines an inboard blade spar depth $Sd_T$ which is less than the tip blade spar depth $SD_T$. A tip spar leading edge 74 includes an opening 76.

A spar interface section 34' bridges the blade spar 30' and the tip spar 36' transverse a butt joint B. The spar interface section 34' includes a central spar interface section 78 of a depth which fits within the inboard blade spar depth Sd and outboard spar sections 80B, 80T which fits within the blade spar depth $SD_B$ and tip spar depth $SD_T$. The spar interface section 34' slides through openings 66, 76 from the leading edge thereof as indicated by arrow S. Ramped spar interface sections 82B, 82T engage the respective ramped blade spar transition surface 60U, 60L and the ramped tip spar transition surface 72U, 72L. That is, the ramped sections 60U, 60L, 72U, 72L, 82B, 82T provide a mechanical interlock between the spar interface section 34', the blade spar 30' and the tip spar 36'. It should be understood that transition sections of configurations other than ramped transitions such as stepped transitions may also be used with the present invention to provide the mechanical interlock.

A multiple of fasteners 84B are installed through the respective outboard blade spar section upper surface 62U and the outboard blade spar section lower surface 62L and into the central spar interface section 78. A multiple of fasteners 84T are also installed through the respective outboard blade spar section upper surface 62U and the outboard blade spar section lower surface 62L and into the inboard tip spar section upper surface 70U and the inboard tip spar section lower surface 70L and into the central spar interface section 78. The fasteners 84B, 84T are thereby recessed below the respective upper blade spar surface 56U, the lower blade spar surface 56L, the tip spar section upper surface 68U and the tip spar section lower surface 68L. Because of the mechanical interlock, the multiple of fasteners 84B, 84T are preferably arranged in a chordwise pattern generally parallel to the butt joint B such that aerodynamic loads on the replaceable blade tip section 28' place the fasteners 84B, 84T under a shear load. The ramped spar interface sections 82B, 82T engage the respective ramped blade spar transition surface 60U, 60L and the ramped tip spar transition surface 72U, 72L and the fasteners 84B, 84T thereby transfers loads between the blade spar 30' and the tip spar 36'.

A fairing 86 which corresponds to the rotor blade 20' shape covers the butt joint B and the openings 66, 76 within the leading edge 66, 74. That is the fairing 86 is received over the butt joint B to provide an aerodynamic transition surface over the butt joint B between the replaceable tip section 28' and the outboard blade section 26'. The fairing 86 preferably extends for a longitudinal width to cover the fasteners 84B, 84T and the respective outboard blade spar section upper and lower surface 62U, 62L and the inboard tip spar section upper and lower surfaces 70U, 70L. Relatively small fasteners 88 preferably mount the fairing 86 to the upper and lower composite blade skin 56U, 56L to provide a smooth aerodynamic surface. The fasteners 88 may be relatively small because they need only retain the fairing 86 to the blade skins 56U, 56L.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A rotor blade comprising:
a blade spar within a rotor blade;
a tip spar within a removable blade tip section;
a spar interface section which engages said blade spar and said tip spar; and
a multiple of removable fasteners which removably attach said blade spar and said tip spar to said spar interface section, removal of said multiple of removable fasteners releases said removable blade tip section from said rotor blade.

2. The rotor blade assembly as recited in claim 1, wherein said multiple of removable fasteners are threaded fasteners.

3. The rotor blade assembly as recited in claim 1, wherein said multiple of removable fasteners are located transverse a feathering axis of said rotor blade.

4. The rotor blade assembly as recited in claim 1, wherein said multiple of removable fasteners are located parallel to a feathering axis of said rotor blade.

5. The rotor blade assembly as recited in claim 1, wherein said blade spar meets said tip spar at a butt joint.

6. The rotor blade assembly as recited in claim 1, wherein said butt joint is located at approximately 87% R of said blade.

7. The rotor blade assembly as recited in claim 1, wherein said butt joint is located within a constant mid-span air foil cross-section.

8. The rotor blade assembly as recited in claim 1, wherein said blade spar includes an upper blade spar surface and a lower blade spar surface which respectively transitions to an outboard blade spar section upper surface and an outboard blade spar section lower surface at a respective upper and lower transition surface.

9. The rotor blade assembly as recited in claim 8, wherein said tip spar includes a tip spar section upper surface and a tip spar section lower surface which transitions to an inboard tip spar section upper surface and an inboard tip spar section lower surface at a respective upper and lower tip spar transition surface.

10. The rotor blade assembly as recited in claim 9, wherein said spar interface section includes a first ramped spar interface section which engages said upper and lower blade spar transition surface and a second ramped spar interface section which engages said upper and lower tip spar transition surface to provide a mechanical interlock between said spar interface section, said blade spar and said tip spar.

11. The rotor blade assembly as recited in claim 10, wherein said spar interface section slides through an opening formed through a leading edge of said blade spar and said tip spar.

12. The rotor blade assembly as recited in claim 11, further comprising a fairing which covers said multiple of threaded fasteners and said opening formed through said leading edge of said blade spar and said tip spar.

13. The rotor blade assembly as recited in claim 1, wherein said spar interface section is received at least partially within said blade spar and said tip spar.

14. The rotor blade assembly as recited in claim 1, wherein said spar interface section is telescopically engageable with said blade spar and said tip spar.

15. The rotor blade assembly as recited in claim 1, wherein said spar interface section is hollow.

16. The rotor blade assembly as recited in claim 1, wherein said spar interface section is tubular.

17. The rotor blade assembly as recited in claim 1, wherein said spar interface section extends across a butt joint between said removable blade tip section and said rotor blade.

18. A removable tip section for a rotor blade comprising:
a tip spar within a removable blade tip section, said removable tip section defining an anhedral form;
a spar interface section which removably engages the rotor blade and said tip spar; and
a multiple of threaded fasteners which attach said tip spar to said spar interface section at a butt joint located within a constant mid-span airfoil cross-section.

19. The removable tip section assembly as recited in claim 18, wherein said spar interface section includes a multiple of fastener receivers attached thereto to receive said multiple of threaded fasteners.

20. The removable tip section assembly as recited in claim 18, wherein said multiple of threaded fasteners thread into said spar interface section.

21. A removable tip section for a rotor blade comprising:
a tip spar within a removable blade tip section, said removable blade tip section defining an anhedral form, wherein said tip spar includes a tip spar section upper surface and a tip spar section lower surface which transitions to an inboard tip spar section upper surface and an inboard tip spar section lower surface at a respective upper and lower ramped tip spar transition surface;
a spar interface section which engages said tip spar; and
a multiple of threaded fasteners which attach said tip spar to said spar interface section at a butt joint located within a constant mid-span airfoil cross-section.

22. The rotor blade assembly as recited in claim 21, wherein said spar interface section includes a ramped spar interface section which engages said ramped tip spar transition surface to provide a mechanical interlock between said spar interface section and said tip spar.

23. The rotor blade assembly as recited in claim 22, wherein said spar interface section slides through an opening formed through a leading edge of said tip spar.

24. A removable tip section for a rotor blade comprising:
a tip spar within a removable blade tip section, said removable blade tip section defining an anhedral form, wherein said tip spar includes an inboard tip spar section and an outboard tip spar section, said inboard tip spar section generally extending parallel to a feathering axis P defined by a main rotor blade spar and said outboard tip spar section angled relative thereto to define a sweep;
a spar interface section which engages said tip spar; and
a multiple of threaded fasteners which attach said tip spar to said spar interface section at a butt joint located within a constant mid-span airfoil cross-section.

25. The rotor blade assembly as recited in claim 24, wherein said outboard tip spar section includes a multi-angled tip section which is out of a plane defined by said main rotor blade spar.

26. A main rotor blade assembly for a rotary wing aircraft comprising an inboard section, an intermediate section, and an outboard section which define the span of the main rotor blade assembly, wherein said main rotor blade is modular so that a first portion of the blade is removeable with respect to a second portion of the blade at an independently removable spar interface section to accommodate specific mission profiles.

27. The main rotor blade assembly of claim 26, wherein the first portion includes the outboard section of the blade.

28. The main rotor blade assembly of claim 26, wherein said first portion of said blade meets said second portion of said blade at a butt joint.

29. A main rotor blade assembly for a rotary wing aircraft comprising:
an inboard section;
an intermediate section;
an outboard section which defines the span of the main rotor blade assembly, wherein said main rotor blade is modular so that a first portion of the blade is removable with respect to a second portion of the blade to accommodate for specific mission profiles;

an inboard blade spar in the first portion of the blade;
an outboard blade spar in the second portion of the blade;
a spar interface section which engages said inboard blade spar and said outboard blade spar; and
a plurality of removeable fasteners which removeably attaches said inboard blade spar to said spar interface section, and which removeably attaches said spar interface section to said outboard blade spar, removal of said fasteners permits release of said first portion of said blade with respect to said second portion of the blade.

* * * * *

UNITED STATES PATENT AND TRADEMARK OFFICE
CERTIFICATE OF CORRECTION

PATENT NO. : 7,246,998 B2  Page 1 of 1
APPLICATION NO. : 10/991745
DATED : July 24, 2007
INVENTOR(S) : Kovalsky et al.

It is certified that error appears in the above-identified patent and that said Letters Patent is hereby corrected as shown below:

ON THE TITLE PAGE:

Please add the following additional inventors:

(75)   Inventors:
         Ashish Bagai, Hamden, CT (US)
         Bruce F. Kay, Milford, CT (US)

Signed and Sealed this

Thirteenth Day of November, 2007

JON W. DUDAS
*Director of the United States Patent and Trademark Office*